B. D. TABOR.
Sheep Rack.
No. 60,651.                                    Patented Dec. 18, 1866.
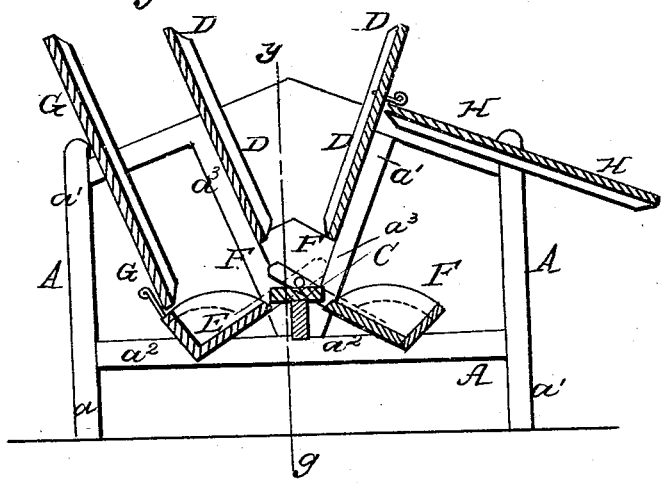
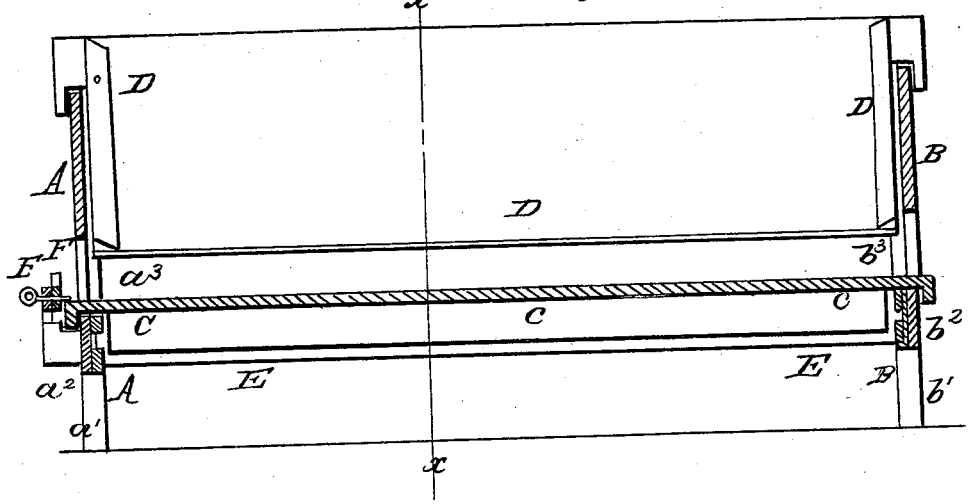
Witnesses.                                                  Inventor:

United States Patent Office.

IMPROVEMENT IN SHEEP RACK.

BYRON D. TABOR, OF WILSON, NEW YORK.

Letters Patent No. 60,651, dated December 18, 1866.

---

*The Schedule referred to in these Letters Patent and making part of the same.*

---

TO ALL WHOM IT MAY CONCERN:

Be it known that I, BYRON D. TABOR, of Wilson, in the county of Niagara, and State of New York, have invented a new and useful Improvement in Sheep Rack; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved sheep rack, taken through the line $x\,x$, fig. 2.

Figure 2 is a vertical longitudinal section of the same, taken through the line $y\,y$, fig. 1.

Similar letters of reference indicate like parts.

My invention consists in an improved sheep rack formed by the combination of the hay rack, end pieces or frames, binder, revolving feed troughs, levers, and revolving covers with each other, the whole being constructed and arranged, as hereinafter fully described, for the purpose of furnishing a simple and efficient feed rack, and one easily set up and taken down for transportation or storage.

A and B are the end frames of the rack, the side uprights, $a^1$ and $b^1$, of which extend down and form feet for the rack to stand upon. These end frames are boarded up or cased upon their outer sides, and they are connected to each other and held in place by the binder, C, and the side boards, D, of the hay rack. The casings of the end frames have holes formed through them just above the cross-bars $a^2$ and $b^2$, for the reception of the binder C, which has notches formed upon its lower side, into which the edges of the said casings enter, and thus bind the end frames, A and B, to each other. The binder, C, at the same time also forms the bottom of the hay rack, thus performing two offices. The end frames, A and B, are also bound to each other by the side boards, D, of the hay rack; the upper parts of the ends of which extend beyond the end frames, and have notches formed in them, which fit down over the upper edges of the casings of the said end frames, as shown in fig. 2. The ends of the side boards, D, are supported against the pressure of the hay placed in the rack by resting upon the inclined bars, $a^3$ and $b^3$, of the end frames A and B, as shown in fig. 1. E are the grain troughs, which rest in notches formed in the upper sides of the cross-bars, $a^2$ and $b^2$, of the frame A and B, as shown in fig. 1. One end of the trough, E, projects through holes formed in the casing of the end frame A, and to these projecting ends are removably attached the levers F. The levers, F, are secured to each other, securing the troughs, E, in proper position to receive the grain by having a pin passed through their crossed ends, as shown in figs. 1 and 2. By removing this pin, and operating the levers F, the troughs E may be revolved or turned over to empty out any dirt that may have found its way into them. G and H are the revolving covers, the upper parts of the ends of which project beyond the end frames A and B, and they are thus pivoted between the upwardly projecting ends of the uprights, $a^1$ and $b^1$, and the upper edges of the side frames A and B, as shown in fig. 1. The said covers are of such a width that when turned into the position in which the cover, H, is represented, their upper edges will come in contact with the sides, D, of the hay rack, in which positions they are held by pins passed through holes formed in the said side boards, D, for that purpose, and protect the sheep from the weather; and they are of such a width that when turned into the position in which the cover, G, is represented, their lower edges will come in contact with the forward edges of the troughs E, in which position they are secured by pins inserted in holes formed in the said edges or the said troughs for their reception, as shown in fig. 1. When using the rack, the side boards, D, of the hay rack always remain in the position shown in fig. 1, and the sheep reach the hay through the spaces between the lower edges of said side boards and the binder C. When it is desired to feed grain to the sheep, the covers are revolved into the position in which the cover, G, is shown; and the said covers act as spouts to conduct the grain, which is poured in over their upper edges, to the troughs E; and at the same time they act as guards to prevent the sheep from having access to the said troughs while the grain is being poured in. By removing the levers, F, from the projecting ends of the troughs E, the entire rack may be easily taken apart for transportation or storage.

I claim as new, and desire to secure by Letters Patent—

An improved sheep rack, formed by the combination of the end pieces or frames A B, the binder C, the sides, D, of the hay rack, the revolving troughs E, levers F, and revolving covers G H, with each other, the parts being constructed and arranged substantially as herein shown and described, and for the purposes set forth.

BYRON D. TABOR.

Witnesses:
WM. P. GROUT,
JAMES H. JOHNSON.